3,148,097
SOLID SOLUTIONS OF LITHIUM PERCHLORATE IN POLYMER
Lucius G. Gilman, Wakefield, Mass., assignor to Monsanto Research Corporation, St. Louis, Mo., a corporation of Delaware
No Drawing. Filed July 2, 1962, Ser. No. 207,469
5 Claims. (Cl. 149—83)

This invention relates to solid solutions, and more particularly provides novel solid solutions of lithium perchlorate and an olefinic polymer in the same homogeneous phase.

It has elsewhere been established that lithium perchlorate can be dissolved in substantial amounts in an olefinic monomer and the monomer polymerized in the presence of dissolved lithium perchlorate to provide solid polymeric solutions of lithium perchlorate and polymer in the same homogeneous phase.

In certain cases, polymers are known which correspond to monomers that are unstable and are not known: specifically, polyvinyl alcohol is an example of this. With such polymers, obviously, the method of providing solid solutions of lithium perchlorate and an olefin polymer in solid solution starting from the monomer is not available.

It is an object of this invention to provide a method of producing solid solutions of lithium perchlorate in a vinyl polymer and novel products thereof.

A particular object is to provide novel solid solutions of lithium perchlorate and a vinyl polymer in the same homogeneous phase, wherein said polymer is one wherein the repeating unit corresponds to a hypothetical unstable vinyl monomer, and methods of producing the same.

These and other objects will become evident from a consideration of the following specification and claims.

It has now been found that solid solutions of lithium perchlorate and a vinyl polymer in the same homogeneous phase can be produced by heating lithium perchlorate with a plasticizer and a polymer selected from the class consisting of polymers of vinyl alcohol and polymers of an acetal of vinyl alcohol.

When lithium perchlorate is introduced into the same homogeneous phase as a polymeric binder, it has been found that the intimate association of the polymer and the salt provides a product having beneficially altered properties as compared to the polymer itself. The nature of the alteration in the properties of the polymer depends on the amount of lithium perchlorate introduced. At lower concentrations, the perchlorate tends to exhibit plasticizing effects, whereas in higher concentrations, it can harden and stiffen the polymer. Furthermore, the amorphous or crystalline nature of the polymer may be altered. The present products are also unusually dense materials. Additionally, besides the effect on the physical properties of the polymer, the lithium perchlorate is observed to alter the electrical properties thereof, providing a conductivity which is absent in the polymeric binder itself.

The products of this invention comprise polymeric solid solutions of lithium perchlorate, a plasticizer and a polymer selected from the class consisting of polyvinyl alcohol and acetals thereof in the same homogeneous phase.

By solid solution is meant that the perchlorate and the polymer are homogeneously mixed and in the same phase, to the extent that heterogeneity therebetween is not evident on examination under an ocular microscope.

The polymeric binder will be a matrix comprising polymer having a molecular weight at least sufficient to make the polymer solid at room temperature, and preferably the proportions of plasticizer and polymer in the polymeric binder will be such as to make the polymeric binder solid at room temperature. It is undesirable to have the molecular weight so high that the polymer is infusible and insoluble. Preferably the product will be sufficiently elastomeric to have a tensile strength of at least 50 lbs. per square inch (p.s.i.) and ultimate elongation (at break) of at least 20%.

The perchlorate must be anhydrous, containing less than about 0.5 mole percent water, and in references to it, it is to be understood that anhydrous perchlorate is meant.

To provide a significant alteration in the properties of the product from those of the polymeric binder alone, dissolved lithium perchlorate will be present in the polymeric binder in an amount at least equal to 0.1, and preferably at least about 0.5 part by weight per part of the vinyl polymer combined therewith in the polymeric binder, in the same homogeneous phase. Higher ratios in which the amount of dissolved lithium perchlorate is equal to or exceeds the weight of the vinyl polymer are especially desirable for many applications and can be attained in accordance with this invention. Indeed, the dissolved perchlorate can constitute 75% or more of the weight of the total composition.

The essential polymer component of the present product is a polyvinyl alcohol or an acetal thereof. As is known in the art, the polyvinyl alcohol and the acetals thereof are prepared by polymerizing a vinyl ester such as vinyl acetate, hydrolyzing the resulting polymer and thereby forming a polyvinyl alcohol, and treating this polyvinyl alcohol with an aldehyde to form the acetal of the alcohol. Properties of the polymers vary depending on the extent of the initial hydrolytic removal of the acid esterifying groups (acetate), the extent of acetalization of the resulting hydroxy groups, and also on factors such as the molecular weight of the polymer. In general, for utility in connection with the present invention, the polyvinyl ester should be hydrolyzed to an esterified OH content of below about 10%. The remaining portion of the molecule may comprise entirely vinyl alcohol units with free OH groups. Polyvinyl alcohol is useful in itself for the practice of the present invention. Alternatively, any percentage of the alcohol groups formed by hydrolysis of the esterified groups may be acetalized. The acetalizing agent can be any of a variety of aldehydes. Preferably, this will be a simple lower aliphatic aldehyde, in which a saturated hydrocarbon radical is attached to the carboxyl aldehyde group. Thus for example, useful aldehydes for the acetalization of the polyvinyl alcohol include formaldehyde, acetaldehyde, propionaldehyde, n-butyraldehyde, i-butyraldehyde, valeraldehyde and the like.

The third component of the presently provided solid solutions is a plasticizer. By a plasticizer is meant a fluid material compatible with the polymeric component and which softens the polymeric material. A variety of alcohols and esters are effective plasticizers toward polyvinyl alcohol and its acetals, and may be employed in this connection. Thus for example, specific useful hydroxylic plasticizers are ethylene glycol, trimethylene glycol, 1,6-hexanediol, 1,2-hexanediol, glycerol, pentaerythritol, and the like. Derivatives of alcohols which may be used as plasticizers include materials such as bis-propylformal, 1,3-dioxane, the monomethyl ether of diethylene glycol, the dimethyl ether of diethylene glycol, and so forth. Further, the useful plasticizers in the present connection include esters, particularly aryl polyfunctional acid esters, such as dialkyl phthalates like di-n-butyl phthalate, phosphate esters like tricresyl phosphate, and so forth.

The amount of plasticizer to be employed in connection with a polyvinyl alcohol or acetal will vary depending on the specific polymer and specific plasticizer being employed, and the extent of solubility of lithium perchlorate which it is desired to achieve. Usually at least one part of plasticizer per ten parts by weight of polymer will be desirable. To avoid producing a mass which will be fluid at room temperature, it is usually desirable to remain below a proportion of ten parts of plasticizer to one of polymer, and indeed, usually less plasticizer than polymer, by weight, will be preferred.

The procedure of the invention comprises heating lithium perchlorate with a mixture of polymer and plasticizer to effect solution thereof. The temperature to which the mix should be heated should be at least sufficient to form a melt. The temperature employed should be, of course, below the decomposition temperature of the reaction mixture components. For example, temperatures in the range of between 100 and 200° C. are generally suitable. Usually stirring at an elevated temperature is required to put the lithium perchlorate into solution, after which the melt may be cooled back to room temperature to provide the solid solution product of the present invention, wherein lithium perchlorate is in the same homogeneous phase as a polymeric binder comprising a plasticizer and a polymer selected from the class consisting of polyvinyl alcohol and acetals of polyvinyl alcohol.

The invention is illustrated but not limited by the following examples, in which all parts are by weight unless otherwise noted.

Example 1

A polyvinyl butyral polymer is provided which has a hydroxy equivalent as polyvinyl alcohol of 17.5–21%, acetate equivalent as polyvinyl acetate, 2.5% maximum, remainder polyvinyl butyral. It has a viscosity of about 60 centipoises in a 6% by weight solution in methano at 20° C.

A mixture is prepared at 190° C. of 16 parts of the stated polyvinyl butyral, 4 parts of di-n-butyl phthalate and 4 parts of diethylene glycol. This melt dissolves better than 40 parts of lithium perchlorate at 190° C. When the melt is cooled in Dry Ice, it provides a slightly gummy polymeric solution of lithium perchlorate.

Example 2

A mixture of 16 parts of polyvinyl butyral and 4 parts di-n-butyl phthalate is heated to form a clear homogeneous colorless viscous melt at 150° C. To this melt is added about forty parts of lithium perchlorate, which causes the solution to darken. About 20 parts of dibutyl phthalate are added, and the solution is cooled in Dry Ice. The resulting polymeric solid, containing dissolved lithium perchlorate, is a hard, slightly porous mass.

Example 3

A mixture of 15 parts of polyvinyl alcohol and 15 parts of ethylene glycol is heated to 170° C., at which temperature it forms a clear viscous liquid. Lithium perchlorate is added to the mixture at this temperature, and it is found that almost 70 parts of the perchlorate dissolve readily, producing little change in viscosity. The melt is now cooled down to room temperature. It is like soft moldable gum rubber at room temperature. The normal crystallinity of polyvinyl alcohol is eliminated.

While the invention has been illustrated with reference to the various specific embodiments thereof it is to be appreciated that modifications and variations can be made without departing from the scope of the invention, which is limited only as defined in the appended claims.

What is claimed is:
1. A polymeric solid solution of lithium perchlorate in a polymeric binder comprising a polymer selected from the class consisting of polyvinyl alcohol and acetals thereof, and a plasticizer for said polymer, in the same homogeneous phase.
2. The product of claim 1 wherein said polymer is polyvinyl alcohol.
3. The product of claim 1 wherein said plasticizer comprises ethylene glycol.
4. A polymeric solid solution of lithium perchlorate in the same homogeneous phase as a polymeric binder comprising polyvinyl butyral and di-n-butyl phthalate.
5. The method of producing a polymeric solid solution of lithium perchlorate and a vinyl polymer, in the same homogeneous phase, which comprises heating a mixture of lithium perchlorate, a polymer selected from the class consisting of polyvinyl alcohol and acetals thereof, and a plasticizer for said polymer.

References Cited in the file of this patent

UNITED STATES PATENTS

| | | |
|---|---|---|
| 2,622,277 | Bonell | Dec. 23, 1952 |
| 3,000,713 | Gold | Sept. 19, 1961 |
| 3,003,310 | D'Alelio | Oct. 10, 1961 |
| 3,022,149 | Cramer | Feb. 20, 1962 |
| 3,054,702 | Stengel et al. | Sept. 18, 1962 |
| 3,094,444 | Hedrick et al. | June 18, 1963 |